(12) United States Patent
Tanaka et al.

(10) Patent No.: US 11,820,007 B2
(45) Date of Patent: Nov. 21, 2023

(54) ABNORMALITY DETECTION DEVICE AND ABNORMALITY DETECTION METHOD

(71) Applicant: Nissan Motor Co., Ltd., Kanagawa (JP)

(72) Inventors: Yasuhiro Tanaka, Kanagawa (JP); Toshimichi Urakawa, Kanagawa (JP); Toru Takagi, Kanagawa (JP); Satoru Hirose, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 600 days.

(21) Appl. No.: 17/054,344

(22) PCT Filed: May 11, 2018

(86) PCT No.: PCT/JP2018/018313
§ 371 (c)(1),
(2) Date: Nov. 10, 2020

(87) PCT Pub. No.: WO2019/215909
PCT Pub. Date: Nov. 14, 2019

(65) Prior Publication Data
US 2021/0191346 A1    Jun. 24, 2021

(51) Int. Cl.
*B25J 19/06* (2006.01)
*F16P 1/06* (2006.01)
*G05B 9/02* (2006.01)

(52) U.S. Cl.
CPC ............... *B25J 19/06* (2013.01); *F16P 1/06* (2013.01); *G05B 9/02* (2013.01)

(58) Field of Classification Search
CPC . F16P 1/06; B25J 9/1674; B25J 19/06; G05B 9/02; G05B 2219/39237;
(Continued)

(56) References Cited

U.S. PATENT DOCUMENTS 10,766,151 B2 *  9/2020  Kuno ..................... G01L 3/00
11,241,792 B2 *  2/2022  Kinugasa ............... B25J 9/1692
(Continued)

FOREIGN PATENT DOCUMENTS

EP     3299132 A1    3/2018
EP     3305483 A1    4/2018
(Continued)

*Primary Examiner* — An H Do
(74) *Attorney, Agent, or Firm* — Osha Bergman Watanabe & Burton LLP (57) ABSTRACT

An abnormality detection device of detecting an abnormality of a robot which executes an operation such as welding on a target object, includes a control unit including a signal input unit to which a detection signal is input, the detection signal being obtained when a state of the robot is detected by a sensor, so that the control unit detects an abnormality of the robot in accordance with the detection signal. The control unit outputs a control signal to the robot so as to execute an integrated action in which a necessary action necessary for detecting an abnormality is added to a predetermined action in which the operation is not executed on the target object. The control unit detects the abnormality of the robot in accordance with the detection signal detected when the integrated action is executed.

8 Claims, 5 Drawing Sheets

(58) Field of Classification Search
CPC ............ G05B 23/0262; G05B 19/4155; G05B 2219/4227; G05B 2219/50391; G01M 99/005; G06N 20/00
See application file for complete search history.

(56) References Cited

U.S. PATENT DOCUMENTS

| | | |
|---|---|---|
| 11,370,131 B2 * | 6/2022 | Hirose ................. B25J 19/0066 |
| 11,433,539 B2 * | 9/2022 | Kobayashi .......... G01M 99/005 |
| 2017/0087719 A1 | 3/2017 | Tsuchiya |
| 2018/0147735 A1 | 5/2018 | Kuno et al. |
| 2018/0154529 A1 | 6/2018 | Shimizu et al. |

FOREIGN PATENT DOCUMENTS

| | | |
|---|---|---|
| JP | H09-174482 A | 7/1997 |
| JP | 2006-281421 A | 10/2006 |
| JP | 2014-226754 4 | 12/2014 |
| JP | 2017-61001 A | 3/2017 |
| JP | 2017-200710 A | 11/2017 |
| WO | 2016/185593 A1 | 11/2016 |

* cited by examiner

ABNORMALITY DETECTION DEVICE AND ABNORMALITY DETECTION METHOD

TECHNICAL FIELD

The present invention relates to an abnormality detection device and an abnormality detection method of detecting an abnormality of a movable apparatus such as a multi-axis robot.

BACKGROUND ART

Abnormality detection devices for articulated industrial robots are known, as disclosed in Patent Literature 1. The device disclosed in Patent Literature 1 detects a moving position of each joint shaft of the robot and disturbance torque applied to the shaft at predetermined intervals when the robot is in operation, and calculates an average value of the disturbance torque detected at each moving position. The device then compares the calculated average value with a predetermined threshold, and determines that the robot has an abnormality when the average value exceeds the threshold.

CITATION LIST

Patent Literature

Patent Literature 1: Japanese Unexamined Patent Application Publication No. H9-174482

SUMMARY OF INVENTION

The movement of the respective joint shafts is sometimes small depending on the routine operations of the robot, and the small movement decreases the influence on the disturbance torque, which may impede the detection of a change in the disturbance torque necessary for the abnormality detection. The device disclosed in Patent Literature 1 may fail to detect an occurrence of an abnormality and thus has a problem of the accuracy of the abnormality detection if the change in the disturbance torque is small, since the device simply compares the disturbance torque with the constant threshold without taking account of the contents of the operations of the robot.

In view of the foregoing problem, the present invention provides an abnormality detection device and an abnormality detection method capable of detecting an abnormality of a movable apparatus with a high accuracy regardless of whether the movement of the movable apparatus is small.

An aspect of the present invention includes a control unit including a signal input unit to which a detection signal is input, the detection signal being obtained when a state of a movable apparatus is detected by a sensor, so that the control unit detects an abnormality of the movable apparatus in accordance with the detection signal. The control unit outputs a control signal to the movable apparatus so as to execute an integrated action in which a necessary action is added to a predetermined action in which the operation is not executed on a target object. The control unit detects an abnormality of the movable apparatus in accordance with the detection signal detected when the integrated action is executed.

ADVANTAGEOUS EFFECTS

The aspect of the present invention can detect an abnormality of the movable apparatus with a high accuracy regardless of whether the movement of the movable apparatus is small.

DESCRIPTION OF EMBODIMENTS

Embodiments of the present invention will be described below with reference to the drawings.

Explanations of First Embodiment

Figure 1:
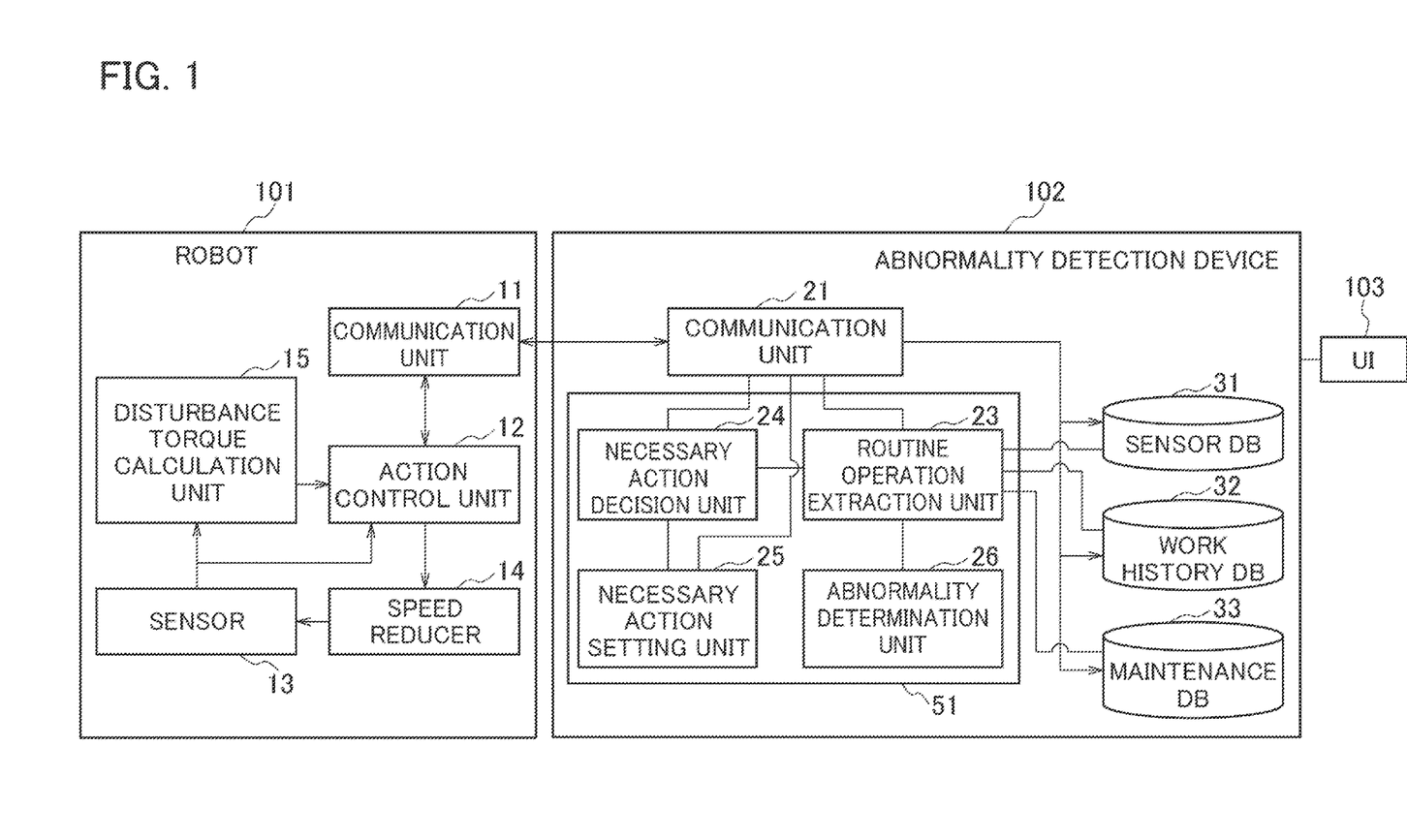
FIG. 1 is a block diagram illustrating a configuration of an abnormality detection device according to an embodiment of the present invention.

FIG. 1 is a block diagram illustrating a configuration of an abnormality detection device and peripheral apparatuses according to an embodiment of the present invention. As illustrated in FIG. 1, the abnormality detection device 102 according to the present embodiment is connected to a robot 101 (a movable apparatus) and a user interface 103 (indicated by reference sign "UI" in FIG. 1), and detects an abnormality of the robot 101. As used herein, the phrase "detecting an abnormality" encompasses a concept of not only detecting an abnormality currently caused but also predicting an abnormality which can be caused later.

The robot 101 is a teaching-playback multi-axis robot, for example. The term "teaching-playback" is indicative of a function of actually operating a robot to make action by a user using a teaching pendant belonging to the robot, and storing and reproducing the action so as to cause the robot to perform the action. While the present embodiment is illustrated with the teaching-playback robot, the present invention is not limited to this case.

The robot 101 includes a plurality of speed reducers 14, a sensor 13, an action control unit 12, a disturbance torque calculation unit 15, and a communication unit 11.

Each speed reducer 14 includes a servo motor (simply referred to below as a "motor") for operating each joint shaft of a robot arm, and is operated in accordance with the control by the action control unit 12. The operation of the respective speed reducers 14 causes a welding electrode (a welding part) mounted at the tip of the robot arm, for example, to come into contact with a necessary part of a target object to be processed (for example, a metal blank material) so as to execute the welding operation. The robot 101 can further execute various kinds of operations such as pressing, coating, resin molding, and assembling of a target object, in addition to the welding operation.

The sensor 13 includes a pulse generator or an encoder, for example, and detects various kinds of physical amounts such as a position and an angle of the robot arm operated by the respective speed reducers 14, a rotation angle, a rotation speed, power consumption, and a current of each motor, and a rotation angle of the respective speed reducers 14. The sensor 13 also detects a value of torque caused in each motor. The sensor 13 detects the respective physical amounts described above when the robot 101 executes an operation (such as welding) on the target object, and when the robot 101 executes a routine operation (a predetermined action) which is an action not performed on the target object. A detection signal detected by the sensor 13 (a detection signal obtained when the state of the movable apparatus is detected) is sent to the abnormality detection device 102 through the communication unit 11.

The action control unit 12 causes the respective speed reducers 14 to operate according to an action program set by the teaching described above, and controls the respective robot arms and the joint shafts mounted on the robot 101 to perform necessary actions. When receiving, from the abnormality detection device 102, a control signal which directs an integrated action to be executed for detecting an abnormality caused in the corresponding speed reducer 14, as described below, the action control unit 12 controls the corresponding speed reducer 14 to execute the integrated action.

The disturbance torque calculation unit 15 calculates disturbance torque caused in each motor mounted in the respective speed reducers 14. The term "disturbance torque" refers to a difference between a torque instruction value when controlling each motor and a torque detection value detected by the sensor 13. The difference between the torque instruction value and the torque detection value is substantially constant when the speed reducer 14 is in a normal state and the motor operates stably, and the disturbance torque thus shows a stable numerical value. When an abnormality is caused in the speed reducer 14, the operation of the motor is not stable, and a great change occurs in the disturbance torque applied to the motor.

The communication unit 11 sends work data of the robot 101 and various kinds of data such as the disturbance torque to the abnormality detection device 102. When the control signal for directing the execution of the integrated action described below is sent from the abnormality detection device 102, the communication unit 11 receives and outputs the control signal to the action control unit 12.

The respective functions that the robot 101 has can be implemented in single or plural processing circuits. The respective processing circuits include a programmed processing device, such as a processing device including an electric circuit. The processing device includes an application-specific integrated circuit (ASIC) configured to execute the functions that the robot 101 has or conventional circuit components.

Next, the configuration of the abnormality detection device 102 is described below. The abnormality detection device 102 includes a communication unit 21, a control unit 51, and various kinds of databases (DBs). The control unit 51 includes a routine operation extraction unit 23, a necessary action decision unit 24, a necessary action setting unit 25, and an abnormality determination unit 26. The databases include a sensor DB 31, a work history DB 32, and a maintenance DB 33.

The sensor DB 31 stores various kinds of detection signals detected by the sensor 13. The detection signals to be stored include various detection signals detected by the sensor 13 when the robot 101 is executing a routine operation such as a chip dressing action. The detection signals detected by the sensor 13 include the position and the angle of the respective robot arms, the rotation angle and the rotation speed of the respective motors, and the rotation angle of the respective speed reducers 14, as described above. The sensor DB 31 also stores the disturbance torque calculated by the disturbance torque calculation unit 15. The sensor DB 31 thus serves as a storage unit configured to store the detection signals detected by the sensor 13 when the routine operation is executed by the robot 101.

The work history DB 32 stores work data of the robot 101. The work data includes various kinds of data regarding the work of the robot 101, such as a work date, a work-started time, a work-stopped time, a continuous work time, and a continuous suspension time. The work data also includes a drive mode of the respective speed reducers 14. The drive mode includes a normal drive mode, a maintenance mode, and a stop mode.

The maintenance DB 33 stores maintenance data acquired when an abnormality is caused or the occurrence of an abnormality is predicted in the respective speed reducers 14, and maintenance is then made for the robot 101. The maintenance data can be input by the operator through the user interface 103. Alternatively, the maintenance may be determined to be made when the robot 101 is operated in the maintenance mode described above, so as to automatically create and store the maintenance data. The maintenance data includes an ID number of the corresponding speed reducer 14 to be maintained, the date and time of the maintenance executed, and the contents of the maintenance (such as a replacement, a repair, and a change of grease).

The communication unit 21 communicates with the communication unit 11 included in the robot 101. The communication unit 21 outputs, to the work history DB 32, the work data of the robot 101 sent from the robot 101. The communication unit 21 also receives the detection signals detected by the sensor 13 and sent from the robot 101 to output the detection signals to the sensor DB 31. The communication unit 21 thus serves as a signal input unit to which the detection signals obtained when the state of the robot 101 (the movable apparatus) is detected by the sensor 13 are input.

The abnormality determination unit 26 acquires, from the sensor DB 31, the disturbance torque of the motor mounted in each speed reducer 14 of the robot 101, and determines whether an abnormality is caused in the speed reducer 14 operated by the corresponding motor in accordance with the acquired disturbance torque. For example, the abnormality detection unit 26 calculates an abnormality level described below.

The abnormality level a(x'), where x' is the disturbance torque, is given by the following formula (1):

$$a(x')=\{(x'-m)^2\}/2 \cdot s^2 \qquad (1)$$

where m is a sample average of the disturbance torque, and s is a standard deviation of the disturbance torque.

The abnormality determination unit 26 determines that the corresponding speed reducer 14 has an abnormality when the abnormality level a(x') exceeds a predetermined threshold. Instead of the above method, the abnormality determination unit 26 may calculate the abnormality level by use of a probability distribution such as kernel density estimation and density ratio estimation.

Still another method for the abnormality determination is to obtain a difference between the disturbance torque and a predetermined reference value through a mathematical operation, and further calculate a rate of change of the difference with the passage of time. The corresponding speed reducer 14 can be determined to have an abnormality when the rate of change exceeds a predetermined threshold. The predetermined reference value may be an average of the disturbance torque acquired in the same month one year ago.

The routine operation extraction unit 23 extracts the work data during the period of time in which the robot 101 is executing the routine operation (the predetermined action), in accordance with the work data of the robot 101 stored in the work history DB 32. The routine operation as used herein refers to an action not executed on the processing target object by the robot 101 (the movable apparatus). For example, the routine operation is an action (a tip dressing action) of removing dust adhering to the surface of the welding electrode performed after the robot 101 executes the welding on the target object to be processed such as a blank material.

Instead of the method of using the work data stored in the work history DB 32, a time table set in a production management device in a factory in which the operations are performed on the target object may be referred to when the robot 101 is connected to the production management device via a communication line, so as to acquire the work data of the robot 101.

The necessary action decision unit 24 determines whether a necessary action necessary for detecting an abnormality of the corresponding speed reducer 14 is included in the action of the routine operation, in accordance with the work data of the routine operation extracted by the routine operation extraction unit 23. The rotation angle of the motor in routine operation, namely, the rotation angle of the speed reducer 14 operated by the corresponding motor needs to be large to some extent in order that the abnormality determination unit 26 determines whether the speed reducer 14 has an abnormality as described above. For example, the speed reducer 14 needs to be operated by the rotation angle of 15 degrees or greater. The necessary action decision unit 24 determines whether such a necessary action is included in the routine action. Alternatively, the amount of shift in the position of the robot arm may be used, instead of the use of the rotation angle of the speed reducer 14.

The necessary action setting unit 25 sets the necessary action used in the necessary action decision unit 24. The necessary action is independently allotted to each of the speed reducers 14. For example, the necessary action setting unit 25 stores a map in which the respective speed reducers 14 are matched with the corresponding necessary actions, such that a speed reducer A is set to the rotation angle of 5 degrees, and a speed reducer B is set to the rotation angle of 15 degrees, for example. The necessary action setting unit 25 refers to this map so as to set the respective necessary actions.

The second embodiment described below adds the processing of weighting independently set for each of the speed reducers 14 (for example, multiplies a coefficient of weighting) while the necessary actions of the respective speed reducers 14 are set to a common action, so as to calculate the necessary actions for the respective speed reducers 14 by a mathematical operation. The third embodiment described below sets the respective necessary actions in accordance with the data of the disturbance torque having been acquired when the abnormality was caused in the respective speed reducers 14.

The necessary action may be either an action attendant on the routine operation or a dummy action irrelative to the routine operation. Since the necessary action is added to the routine operation (the predetermined action), such as a chip dressing action, not executed on the target object (for example, welding), the necessary action does not have an influence on the operation executed on the target object.

The necessary action setting unit 25 sets the integrated action in which the necessary action is added to the predetermined action such as a chip dressing action, and sends the integrated action to the robot 101.

Figure 2:
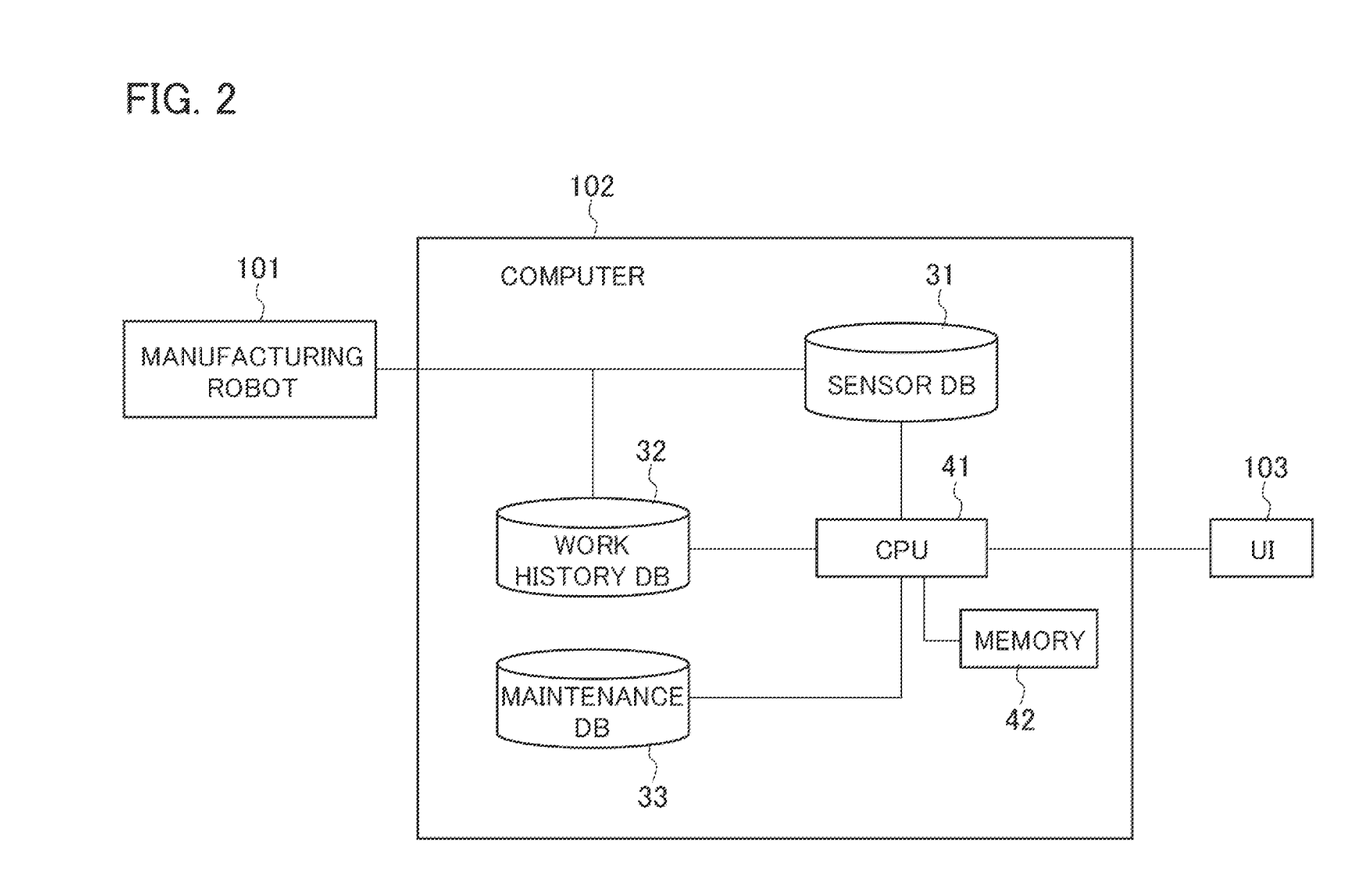
FIG. 2 is an explanatory diagram showing an example in which the abnormality detection device shown in FIG. 1 is illustrated with an integrated computer.

The abnormality detection device 102 may be implemented by a computer including a central processing unit (CPU) 41, a memory 42, and the various databases (the sensor DB 31, the work history DB 32, and the maintenance DB 33), as illustrated in FIG. 2. A computer program (an abnormality detection program) is installed on the computer and executed so as to function as the abnormality detection device 102. The CPU 41 thus functions as a plurality of information processing circuits included in the abnormality detection device 102, namely, functions as the routine operation extraction unit 23, the necessary action decision unit 24, the necessary action setting unit 25, and the abnormality determination unit 26.

The respective functions included in the abnormality detection device 102 described above can be implemented in single or plural processing circuits. The respective processing circuits include a programmed processing device, such as a processing device including an electric circuit. The processing device includes an application-specific integrated circuit (ASIC) configured to execute the functions included in the abnormality detection device 102 or conventional circuit components.

Next, the processing process of the abnormality detection device 102 according to the first embodiment is described below with reference to the flowchart shown in FIG. 3.

First, in step S11, the routine operation extraction unit 23 acquires the work data when the robot 101 is executing the routine operation, from the work data stored in the work history DB 32. As described above, the routine operation extraction unit 23 may acquire the work data of the robot 101 while referring to the time table set in the production management device when the abnormality detection device 102 is connected to the production management device via the communication line.

In step S12, the necessary action setting unit 25 sets the necessary action necessary for detecting an abnormality of the corresponding speed reducer 14. As described above, the necessary action setting unit 25 stores the map in which the respective speed reducers 14 are matched with the necessary actions, and refers to the map so as to set the respective necessary actions. For example, when the rotation angle necessary for detecting an abnormality of the speed reducer 14 is set to 15 degrees, the necessary action setting unit 25 sets the rotation angle of 15 degrees as the necessary action.

In step S13, the necessary action decision unit 24 determines whether the above necessary action is included in the routine operation in accordance with the work data acquired in the processing in step S11. In particular, the necessary action decision unit 24 determines whether the action in which the rotation angle of the corresponding speed reducer 14 is set to 15 degrees or greater is included in the routine operation.

When the necessary action is included in the routine operation, the necessary action setting unit 25 determines that the addition of the necessary action is not needed ("Unnecessary" in step S14), and the process proceeds to step S16.

When the necessary action is not included ("Necessary" in step S14), the process proceeds to step S15.

In step S15, the necessary action setting unit 25 sets the integrated action in which the necessary action is added to the predetermined action to be executed by the corresponding speed reducer 14, and outputs the control signal so as to execute the integrated action. The control signal is sent from the communication unit 21 to the communication unit 11 of the robot 101, and is further output to the action control unit 12.

The action control unit 12 controls to execute the action (the integrated action) of rotating the speed reducer 14 by 15 degrees in accordance with the control signal. Alternatively, when the action of rotating the speed reducer 14 by 5 degrees is present in the routine operation, for example, the action control unit 12 changes this action to the action (the integrated action) of rotating the speed reducer 14 by 15 degrees. This enables the necessary action to be included in the routine operation.

In step S16, the abnormality determination unit 26 acquires the disturbance torque when the integrated action including the above necessary action is being executed.

In step S17, the abnormality determination unit 26 determines whether the corresponding speed reducer 14 has an abnormality by use of the above method in accordance with the acquired disturbance torque. For example, the abnormality determination unit 26 calculates the abnormality level according to the formula (1) described above, and determines that the corresponding speed reducer 14 has an abnormality when the calculated abnormality level exceeds a threshold.

The abnormality determination unit 26, when determining that the corresponding speed reducer 14 has an abnormality (YES in step S17), notifies the operator of the occurrence of the abnormality in the speed reducer 14 in step S18. For example, the abnormality determination unit 26 causes a display (not illustrated) provided in the user interface 103 to display an image indicating the occurrence of the abnormality of the speed reducer 14. The process thus can detect the abnormality of the target speed reducer 14 mounted on the robot 101, namely, can detect the abnormality of the robot 101.

As described above, the abnormality detection device 102 according to the first embodiment can achieve the following effects.

(1)

The necessary action setting unit 25 sets the integrated action in which the necessary action necessary for detecting an abnormality of the corresponding speed reducer 14 (for example, the action in which the rotation angle of the gear of the speed reducer 14 is set to 15 degrees) added to the action of the speed reducer 14 performed when the robot 101 (the movable apparatus) executes the routine operation such as a chip dressing action (the predetermined action not executed on the target object). The necessary action setting unit 25 then outputs the control signal for causing the robot 101 to execute the integrated action. The necessary action described above is thus included in the action performed when the robot 101 executes the routine operation. The routine operation extraction unit 23 detects the disturbance torque (the detection signal) upon the execution of the integrated action, so as to detect an abnormality of the target speed reducer 14, namely, detect an abnormality of the robot 101 (an abnormality of the movable apparatus) with a high accuracy.

(2)

The necessary action setting unit 25 sets the integrated action only when the necessary action described above is not included in the action of the speed reducer 14 performed when the robot 101 executes the routine operation, and outputs the control signal so as to cause the robot 101 to execute the integrated action. Namely, the integrated action is not set when the necessary action is already included in the routine operation, so as to avoid an addition of an unnecessary action to the routine operation.

(3)

The necessary action setting unit 25 stores the map in which the respective speed reducers 14 mounted on the robot 101 are matched with the corresponding necessary actions for detecting an abnormality of the respective speed reducers 14. The necessary action setting unit 25 refers to the map to set the respective necessary actions, so as to facilitate the setting of the integrated action of the target speed reducer 14 of which an abnormality is to be detected.

(4)

The necessary action setting unit 25 uses the rotating action of the speed reducer 14 as the necessary action added to the routine operation so as to detect an abnormality of the robot 101. Detecting a change in the disturbance torque of the motor for driving the corresponding speed. reducer 14 can facilitate the decision of an abnormality.

(5)

The operation executed on the target object by the robot 101 is a welding operation. Since the predetermined action excluding the welding operation is the action of removing dust adhering to the welding electrode (the chip dressing action), the disturbance torque calculation unit 15 can accurately detect the disturbance torque caused in the motor when the robot 101 is executing the integrated action, so as to improve the accuracy of detecting an abnormality caused in the robot 101.

Explanations of Second Embodiment

A second embodiment of the present invention is described below. The device configuration is the same as that shown in FIG. 1 described in the first embodiment, and overlapping explanations are not repeated below. The second embodiment differs from the first embodiment in adding weighting processing to the necessary action for each speed reducer 14 mounted on the robot 101 when the necessary action is added to the routine operation. The processing process of the abnormality detection device according to the second embodiment is described below with reference to the flowchart shown in FIG. 4.

Figure 3:
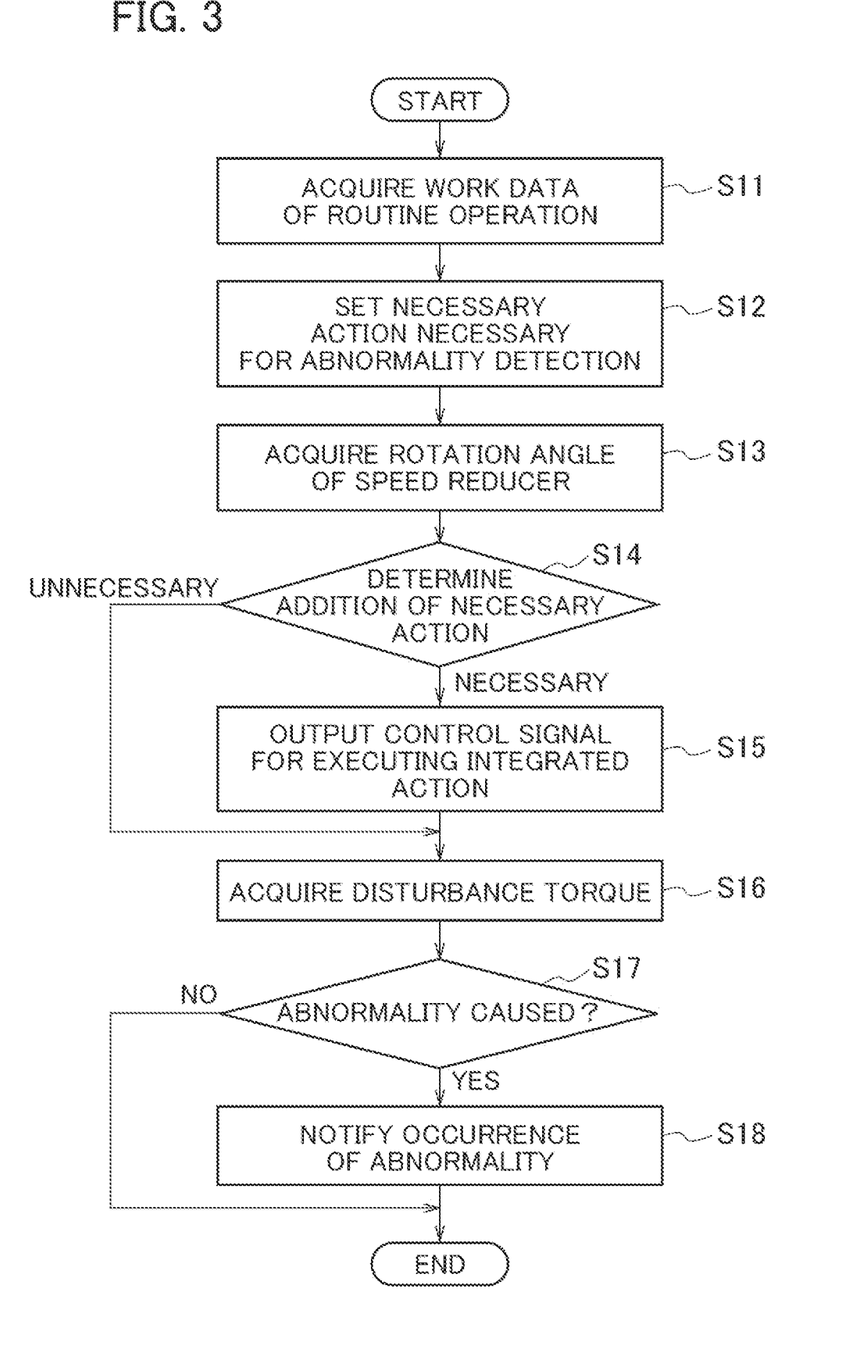
FIG. 3 is a flowchart showing a processing process of the abnormality detection device according to a first embodiment of the present invention.
Figure 4:
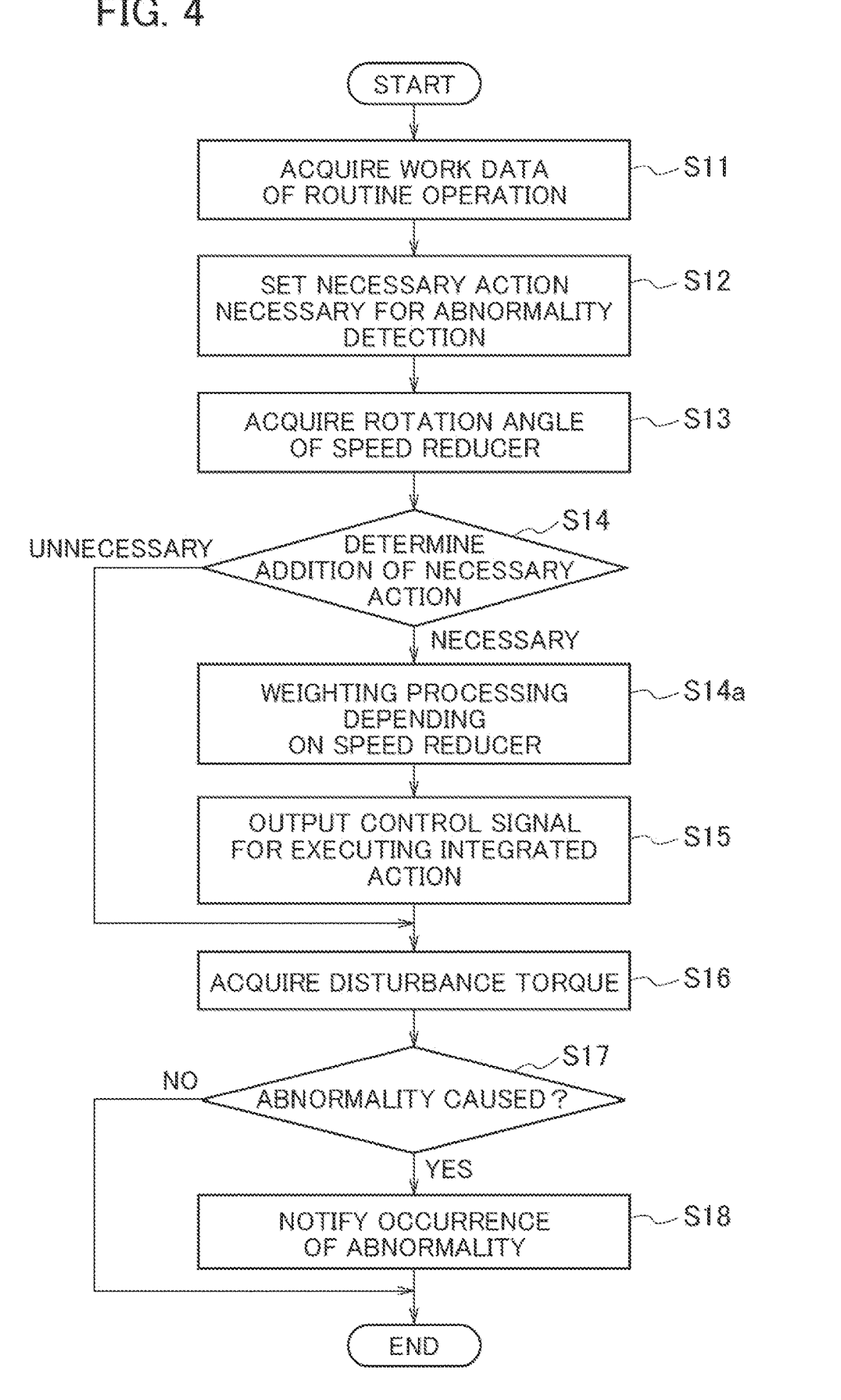
FIG. 4 is a flowchart showing a processing process of the abnormality detection device according to a second embodiment of the present invention.

The flowchart shown in FIG. 4 differs from the flowchart shown in FIG. 3 described above in further including the processing in step S14a. The processing in step S14a is described below.

When the necessary action decision unit 24 determines that the addition of the necessary action is needed in the processing in step S14, the necessary action setting unit 25 executes the weighting processing which varies depending on the speed reducers 14 in step S14a.

For example, since the speed reducer 14 connected with a large load leads to large disturbance torque caused in the motor even if the rotation angle of the speed reducer 14 is small, the detection of an abnormality is possible. The rotation angle of the speed reducer 14 thus can be small, and is set to 5 degrees, for example.

The speed reducer 14 connected with a load smaller than the above load does not lead to a great change in the disturbance torque caused in the motor when the rotation angle of the speed reducer 14 is small, which hinders the detection of an abnormality. The rotation angle of the speed reducer 14 thus needs to be increased, and is set to 15 degrees, for example. This is the weighting processing executed for the necessary action depending on the load size connected to the respective speed reducers 14. The load size connected to the respective speed reducers 14 includes torque driving the load, power consumption of the motor connected to the speed reducer 14, and a flowing current, for example.

In step S15, the necessary action setting unit 25 then sets the integrated action in which the necessary action is added to the predetermined action executed by the corresponding speed reducer 14, and outputs the control signal so as to execute the integrated action, in the same manner as in the first embodiment described above. The subsequent processing after step S15 is the same as that in the first embodiment shown in FIG. 3, and overlapping explanations are not repeated below.

As described above, the abnormality detection device according to the second embodiment executes the weighting processing for the action (the necessary action) to be added so as to detect an abnormality, depending on the load size connected to the target speed reducer 14 of which an abnormality is to be detected. The abnormality detection device thus can obtain the minimum action necessary for detecting an abnormality, so as to avoid an unnecessary increase in the degree of the necessary action. The abnormality detection device thus can detect an abnormality of the speed reducer 14, namely, can detect an abnormality of the robot 101 while minimizing the integrated action.

Explanations of Third Embodiment

A third embodiment of the present invention is described below. The device configuration is the same as that shown in FIG. 1 described in the first embodiment, and overlapping explanations are not repeated below. The third embodiment differs from the first embodiment in setting the necessary action in accordance with a waveform of disturbance torque detected during the routine operation such as chip dressing having been executed before. The processing process of the abnormality detection device according to the third embodiment is described below with reference to the flowchart shown in FIG. 5.

Figure 5:
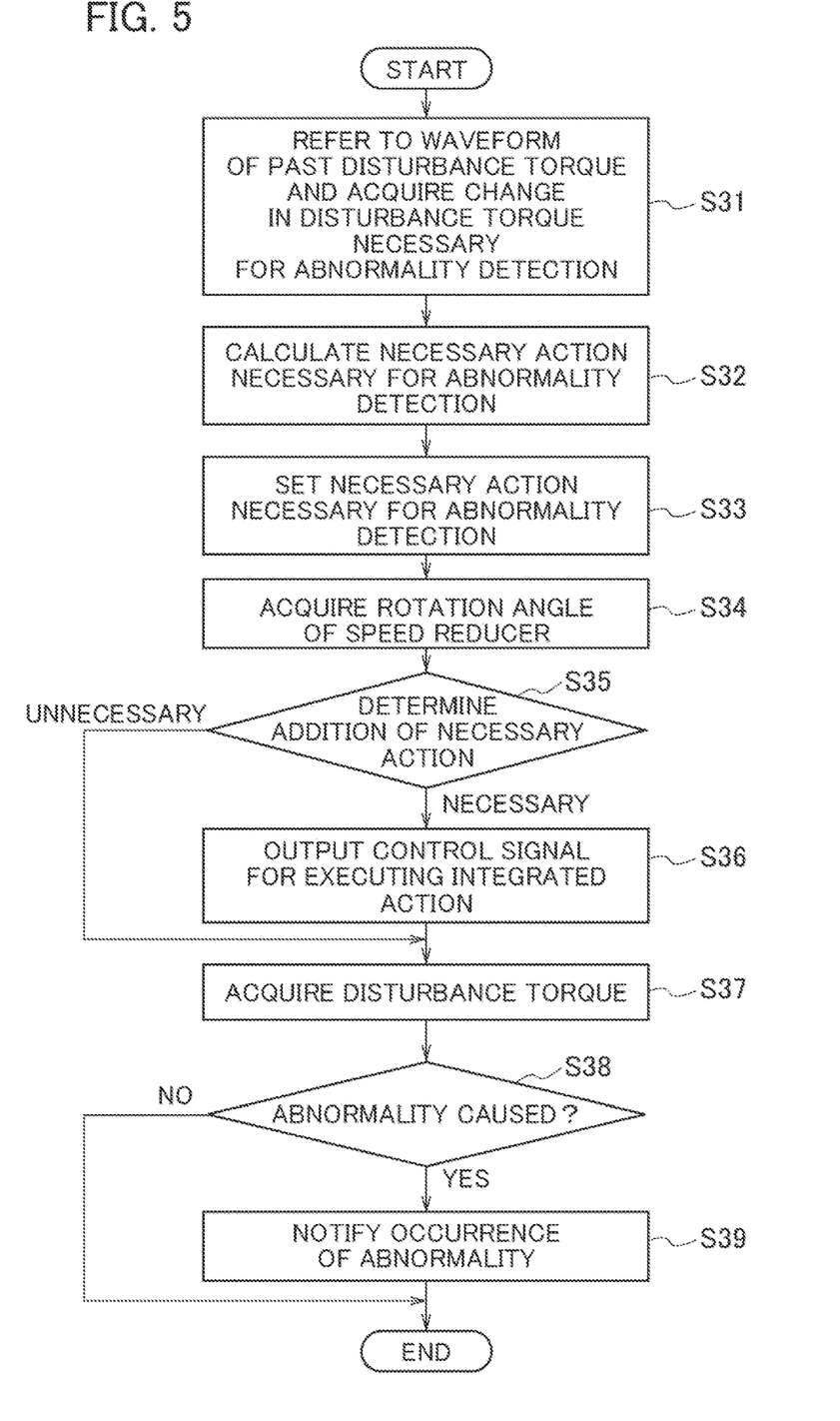
FIG. 5 is a flowchart showing a processing process of the abnormality detection device according to a third embodiment of the present invention.

First, in step S31, the routine operation extraction unit 23 acquires the disturbance torque data when the target speed reducer 14 of which an abnormality is to be determined is executing the routine operation, from the past disturbance torque data stored in the sensor DB 31. The routine operation extraction unit 23 also acquires the maintenance data when the speed reducer 14 had an abnormality and the maintenance was then made, from the maintenance data stored in the maintenance DB 33.

In step S32, the routine operation extraction unit 23 detects a change in the disturbance torque when the speed reducer 14 has an abnormality, and obtains the necessary action of the corresponding speed reducer 14 (the rotation angle of the corresponding speed reducer 14 in this example) necessary for the abnormality decision. In particular, when the data is stored in the sensor DB 31, indicating that the change in the disturbance torque was small when the rotation angle of the speed reducer 14 was smaller than 15 degrees, and the change in the disturbance torque was large when the rotation angle was greater than 15 degrees in the past case in which the abnormality was caused in the speed reducer 14, the routine operation extraction unit 23 determines that the rotation angle of the speed reducer 14 necessary for the abnormality decision is 15 degrees.

In step S33, the necessary action setting unit 25 sets the necessary action. For example, the necessary action setting unit 25 sets the rotation angle of the speed reducer 14 to 15 degrees as the necessary action. The processing in step S34 to step S39 is then executed so as to determine an abnormality of the speed reducer 14.

The processing in step S34 to step S39 is the same as the processing in step S13 to step S18 shown in FIG. 3, and overlapping explanations are not repeated below.

As described above, the abnormality detection device according to the third embodiment causes the necessary action setting unit 25 to obtain the necessary action in accordance with the past disturbance torque caused in the motor of the corresponding speed reducer 14, so as to avoid an unnecessary increase in the degree of the necessary action. The abnormality detection device thus can detect an abnormality of the target speed reducer 14, namely, can detect an abnormality of the robot 101 while minimizing the integrated action.

The movable apparatus as an abnormality detection target is not limited to the robot 101. For example, an engine of a vehicle instead of the motor or a transmission instead of the speed reducer 14 may be applicable as a target. Any movable apparatus including a rotating mechanism and a transmitting mechanism thereof can be a target to be detected, such as a rotating mechanism of a moving object, a moving object such as playground equipment in an amusement park, and a work machine such as a three-dimensional printer. Any other types of movable apparatus may also be a target to be detected.

The abnormality detection device 102 may be installed in a remote place to receive/send necessary signals or data via a communication line so as to detect an abnormality of the robot 101 (the movable apparatus). The abnormality detection of a plurality of robots may be executed by the single abnormality detection device 102. The plural robots may be installed at different locations.

While the present invention has been described above by reference to the embodiments, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

11 COMMUNICATION UNIT
12 ACTION CONTROL UNIT
13 SENSOR
14 SPEED REDUCER
15 DISTURBANCE TORQUE CALCULATION UNIT
23 ROUTINE OPERATION EXTRACTION UNIT
24 NECESSARY ACTION DECISION UNIT
25 NECESSARY ACTION SETTING UNIT
26 ABNORMALITY DETERMINATION UNIT
31 SENSOR DB (STORAGE UNIT)
32 WORK HISTORY DB
33 MAINTENANCE DB
51 CONTROL UNIT
101 ROBOT (MOVABLE APPARATUS)
102 ABNORMALITY DETECTION DEVICE
103 USER INTERFACE

The invention claimed is:

1. An abnormality detection device of detecting an abnormality of a movable apparatus which executes an operation on a target object, the device comprising a controller including a signal input unit to which a detection signal is input, the detection signal being obtained when a state of the movable apparatus is detected by a sensor, so that the controller detects the abnormality of the movable apparatus in accordance with the detection signal, the controller being configured to:
output a control signal to the movable apparatus so as to execute an integrated action in which a necessary action necessary for detecting the abnormality is added to a predetermined action in which the operation is not executed on the target object; and
detect the abnormality of the movable apparatus in accordance with the detection signal detected when the integrated action is executed.

2. The abnormality detection device according to claim 1, wherein the controller outputs the control signal only when the necessary action is not included in the predetermined action.

3. The abnormality detection device according to claim 1, further comprising a sensor database configured to store a detection signal detected when the predetermined action is executed,
wherein the controller sets the necessary action in accordance with the past detection signal stored in the sensor database.

4. The abnormality detection device according to claim 1, wherein:
the movable apparatus includes a plurality of speed reducers; and
the controller refers to a map in which the respective speed reducers are matched with the necessary action set for each of the speed reducers so as to set the necessary action for the respective speed reducers.

5. The abnormality detection device according to claim 1, wherein:
the movable apparatus includes a speed reducer; and
the controller sets the necessary action based on a load size connected to the speed reducer.

6. The abnormality detection device according to claim 1, wherein:
the movable apparatus includes a speed reducer; and
the necessary action is a rotating action of the speed reducer.

7. The abnormality detection device according to claim 1, wherein:
the operation is a welding operation executed on the target object; and
the predetermined action is an action of removing dust on a welding part executing the welding operation.

8. An abnormality detection method of detecting an abnormality of a movable apparatus which executes an operation on a target object, the method comprising:
outputting a control signal to the movable apparatus so as to execute an integrated action in which a necessary action necessary for detecting the abnormality is added to a predetermined action in which the operation is not executed on the target object;
acquiring a detection signal obtained when detecting a state of the movable apparatus by a sensor when the integrated action is executed; and
detecting the abnormality of the movable apparatus in accordance with the acquired detection signal.

\* \* \* \* \*